G. B. DAVIS.
WATER FILTER.

No. 34,411.

Patented Feb. 18, 1862.

Witnesses:
J. W. Coombs
G. W. Reed

Inventor:
G. B. Davis
per Munn & Co.
Attorneys

UNITED STATES PATENT OFFICE.

G. B. DAVIS, OF CHICAGO, ILLINOIS.

WATER-FILTER.

Specification of Letters Patent No. 34,411, dated February 18, 1862.

*To all whom it may concern:*

Be it known that I, G. B. DAVIS, of Chicago, in the county of Cook and State of Illinois, have invented a new and Improved Water-Filter; and I do hereby declare that the following is a full, clear, and exact description of the same, reference being had to the accompanying drawings, making a part of this specification, in which—

Figure 1:
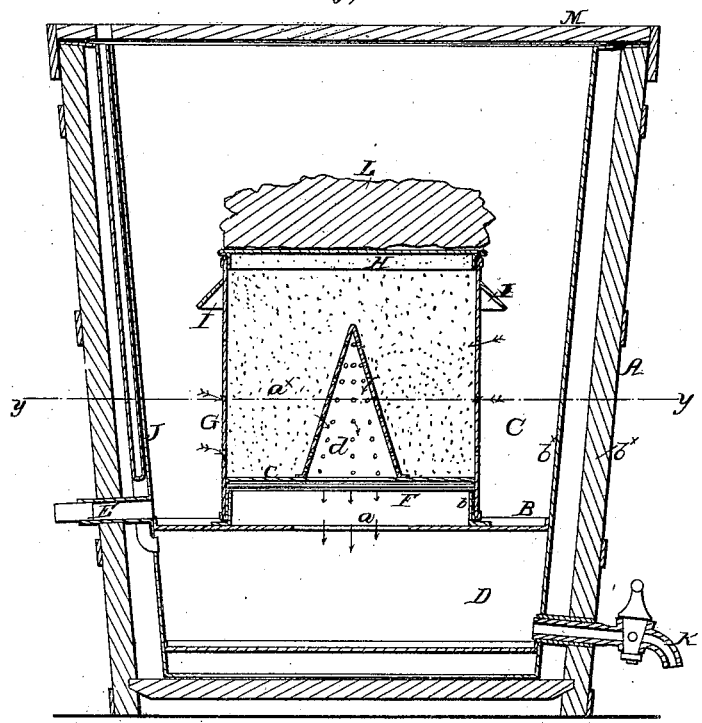
Figure 2:
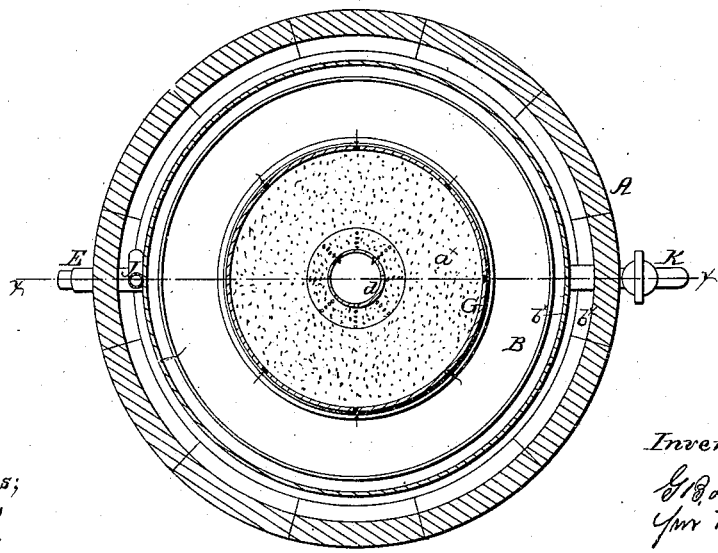

Figure 1, is a vertical central section of my invention taken in the line $x$, $x$, Fig. 2. Fig. 2, a horizontal section of the same, taken in the line $y$, $y$, Fig. 1.

Similar letters of reference indicate corresponding parts in the two figures.

The object of this invention is to obtain a filter which will thoroughly cleanse water, and which will not only admit of being readily cleansed when filthy, but will not be so liable to become foul as those of ordinary construction.

To enable those skilled in the art to fully understand and construct my invention I will proceed to describe it.

A, represents a tub or pail which may be constructed of wood and of slightly taper form. This tub or pail is provided with a false-bottom B, which is perforated with a circular opening $a$, at its center to admit the water through it. This false-bottom divides the tub or pail into two compartments, the upper one C, being for the impure or unfiltered water, and the lower one D, for the filtered or pure water.

In the side of the tub or pail A, at the bottom of the upper compartment C, there is placed a cock E, and upon the upper side of the false-bottom B, and surrounding the opening $a$, there is secured an elevated rim $b$, over which a strainer or metallic screen F, is secured.

G is a filtering case which may be constructed of metal of cylindrical or other convenient shape with its side or sides pierced with holes to admit water into it from the tub or pail. The side or sides of the case G, extend below its bottom $c$, a distance about equal to the height of the rim $b$, and the central part of the bottom $c$, is cut out to receive a metallic perforated cone $d$, the apex of which extends upward a suitable distance within the case G. The cone $d$, is secured at its bottom to the bottom $c$, and in fact forms a part thereof. The case G, is filled and rammed down with a filtering material $a^x$, composed of about equal quantities of fine ground charcoal and clean, coarse sand; a lid or cover H, is fitted tightly over the case G, and ears I, I, are attached to its sides for convenience of handling. The filtering case is fitted over the rim $b$, and crowded down upon it and over screen F, the latter serving as a packing as well as a screen.

Within the tub or pail A, there is placed an air tube J, to admit of the free discharge of the water from D, through a cock K, and the escape of the air from D, as the latter fills with filtered water.

The tub or pail may be constructed with double walls $b^x$, $b^x$, and the space between filled with any suitable non-conducting substance, or a dead-air space may be allowed between. Ice L, may be placed in the upper compartment C.

The water to be filtered is placed in the compartment C, of the tub or pail, the latter being provided with a suitable lid or cover M. This water passes through the sides of the case G, through the filtering medium $a^x$, and into the hollow cone $d$, thence down through the screen F, into the lower compartment D. The large impurities in the water in C, will settle to the bottom and may be withdrawn therefrom through the cock E. The filtering medium $a^x$, therefore takes only a portion of the impurities from the water—the portion which does not settle in C. By this arrangement therefore it will be seen that the filtering medium $a^x$, will not soon become foul or will remain clear much longer than it otherwise would. The screen F, catches all impurities that might chance to pass through the medium $a^x$.

Whenever, from long use, it becomes necessary to cleanse the filtering material from the sediment that does become mixed with it, the case G is removed by means of the ears I, I, the cover of the case is taken off and the filtering medium emptied into a bucket of water, well washed, and then replaced; the screen F, may also be removed and washed, and then replaced.

I do not claim broadly or separately a vessel or water filter with an air tube attached, nor do I claim the material or filtering medium herein described; but,

Having thus described my invention what I do claim as new and desire to secure by Letters Patent, is—

1. The tub or pail A, divided into two compartments C, D, by a horizontal partition or false bottom B, in combination with the filter case G, perforated at its side or sides, provided with an internal perforated cone $d$, and fitted or arranged on the false bottom B, to operate substantially as and for the purpose set forth.

2. The combination of the partition or false bottom B, in tub A, filter case G, cocks E, K, and air-tube J, when all are arranged substantially as and for the purpose specified.

3. The combination of a double-walled tub or pail A, with the false bottom B, and filter case G, arranged as shown to form a combined filter and cooler as set forth.

G. B. DAVIS.

Witnesses:
J. W. BARKER,
H. H. HAAFF.